US007336792B2

(12) United States Patent
Sasaki

(10) Patent No.: US 7,336,792 B2
(45) Date of Patent: Feb. 26, 2008

(54) VIRTUAL ACOUSTIC IMAGE LOCALIZATION PROCESSING DEVICE, VIRTUAL ACOUSTIC IMAGE LOCALIZATION PROCESSING METHOD, AND RECORDING MEDIA

(75) Inventor: Toru Sasaki, Tokyo (JP)

(73) Assignee: Sony Coporation (JP)

( * ) Notice: Subject to any disclaimer, the term of this patent is extended or adjusted under 35 U.S.C. 154(b) by 743 days.

(21) Appl. No.: 10/204,567

(22) PCT Filed: Dec. 25, 2001

(86) PCT No.: PCT/JP01/11379

§ 371 (c)(1),
(2), (4) Date: Dec. 2, 2002

(87) PCT Pub. No.: WO02/052897

PCT Pub. Date: Jul. 4, 2002

(65) Prior Publication Data

US 2003/0118192 A1 Jun. 26, 2003

(51) Int. Cl.
*H04R 5/00* (2006.01)
*H04R 5/02* (2006.01)
*H04N 5/91* (2006.01)
*H04N 7/26* (2006.01)
*H04N 5/00* (2006.01)

(52) U.S. Cl. .............................. 381/17; 381/1; 381/18; 381/310; 381/307; 386/96; 386/124; 386/125; 386/126; 386/95

(58) Field of Classification Search .................. 381/17, 381/1, 18, 310, 307; 386/96, 125, 124, 126; 348/E5.103
See application file for complete search history.

(56) References Cited

U.S. PATENT DOCUMENTS 5,796,843 A * 8/1998 Inanaga et al. ............... 381/17
5,895,124 A * 4/1999 Tsuga et al. .................. 386/98
5,999,698 A * 12/1999 Nakai et al. ................ 386/125
6,430,361 B2 * 8/2002 Lee ............................ 386/98

FOREIGN PATENT DOCUMENTS

JP 06301390 A * 10/1994
JP 07222299 A * 8/1995

OTHER PUBLICATIONS

Applicant's admitted prior art, pp. 1-3, Background section.*

* cited by examiner

*Primary Examiner*—Vivian Chin
*Assistant Examiner*—Devona E Faulk
(74) *Attorney, Agent, or Firm*—Lerner, David, Littenberg, Krumholz & Mentlik, LLP

(57) ABSTRACT

An acoustic image localization processing device that can localize an acoustic image of reproduced sound in an arbitrary position according to the circumstances of reproduction. To accomplish this, an acoustic image localization processing device includes a decoder that reproduces reproduction acoustic signals and angle selection signals SA from a DVD disc; angle selection specification signals that specify modification of the acoustic image position with respect to an angle selection signal; a synthesis circuit that performs processing to modify the acoustic image localization position of reproduced acoustic signals by using the angle selection signal, modified by the angle selection specification signal; and speakers that output reproduced sound, with the acoustic image localized in the modified acoustic image localization position. By specifying modification of the angle selection signal, an acoustic image is localized in an arbitrary position, and each acoustic image localization position is set appropriately, and sound reproduced according to the angle mode selected by the listener.

18 Claims, 5 Drawing Sheets

VIRTUAL ACOUSTIC IMAGE LOCALIZATION PROCESSING DEVICE, VIRTUAL ACOUSTIC IMAGE LOCALIZATION PROCESSING METHOD, AND RECORDING MEDIA

TECHNICAL FIELD

This invention relates to a virtual acoustic image localization processing device suitable for use in the reproduction of, for example, music information and image information.

BACKGROUND ART

In recent years, DVD (Digital Versatile Disc) video discs recorded in multi-channel digital audio formats such as Dolby Digital (AC3) and dts have become widely known.

For example, in the above AC3 format, there are five full-range channels, including a front center channel (C), front left and right channels (L/R), and rear left and right surround channels (SL/SR), as well as an auxiliary channel for low-frequency effects only (SW); speakers corresponding to each of these channels are arranged surrounding the listener, to provide effective reproduced surround sound.

However, one characteristic function of these DVD video discs is what is called a "multi-angle" function. This is a function which enables switching between up to nine camera angles or view angles according to user preference; the images of a movie, sports event, live performance, or similar from a plurality of camera angles are recorded on the recording media, and the user can freely choose among camera angles to enjoy the recorded content.

By using this multi-angle function, when viewing a music video, for example, it is possible to enjoy the performance concentrating mainly on the performance of a noteworthy guitarist, drummer, or other performer, in contrast with viewing of normal reproduced video images.

However, when reproducing conventional DVD video discs such as described above, even if the above-described multi-angle function is used to select a camera angle (view angle), the accompanying audio signals and image signals are reproduced according to the normal viewing mode, irrespective of the selected angle; hence for the listener, the acoustic image localization is not appropriate to the image being viewed, so that there is the problem that an extremely strange sensation results, and the reproduction quality is worsened.

DISCLOSURE OF THE INVENTION

The present invention was devised in light of this consideration, and has as an object the provision of a virtual acoustic image localization processing device which is capable of localizing an acoustic image of reproduced sound in an arbitrary position according to the circumstances of reproduction.

In this invention, the direction from the listener to the acoustic image localized and formed by a sound source or sound source group, or the relative positional relationship between the sound source position and the listener position, is for convenience referred to as an "angle".

In an acoustic image localization processing device to which the acoustic signal of a sound source is provided and which performs processing so as to localize the sound source in an acoustic image localization position, an acoustic image localization processing device of the present invention: comprising localization information modification means, which specifies modification of the acoustic image localization information indicating the position or direction of reproduced acoustic image localization for the sound source with respect to the listening position of the listener, and acoustic image localization processing means, which performs processing to modify the sound source acoustic image localization position based on acoustic image localization information, modification of which is specified by the acoustic image modification means, to obtain reproduction output.

Consequently, the action of this invention is as follows.

Reproduction signals reproduced by reproduction means from the sound source are decoded by a decoder, and acoustic image localization selection information as well as reproduction acoustic signals for each channel are output.

The acoustic image localization selection information is used by the acoustic image localization position modification means to synthesize reproduction acoustic signals for each channel, and to output synthesized acoustic signals for each channel.

Here the acoustic image modification specification means supplies modified acoustic image localization selection information, specifying angle selection for acoustic image localization selection information, to the acoustic image localization position modification means in response to listener operation.

As a result, modified acoustic image localization selection information is supplied to the acoustic image localization position modification means, and reproduction acoustic signals for each channel, supplied from the acoustic image localization position modification means, are subjected to modification of synthesis ratios for each channel, and synthesized acoustic signals are output to each channel so as to become acoustic signals according to the localization information of the reproduced acoustic image with respect to the listener.

In this way, the speakers for each channel emit reproduced sound from synthesized acoustic signals for each channel, the reproduced acoustic image localization position of which has been modified according to the image signal. The listener can then listen to reproduced sound from speakers with a modified localization position or direction of the reproduced acoustic image.

Hence by means of the acoustic image localization processing device of this invention, reproduction sound is reproduced with the acoustic image localization position set appropriately for each angle mode selected by the listener, and consequently there is the advantage that acoustic reproduction with a heightened sense of presence, matching the reproduced position of the image of the sound source, is possible.

Further, the modification processing by the above-described localization information modification means of the acoustic image localization processing device of this invention changes the synthesis ratio of each of the reproducing channels of the reproduced acoustic signals, so that there is the advantage that the acoustic image localization position for each channel is changed to the left, center, or right according as the position of the sound source image on the screen is positioned to the left, in the center, or to the right of the listener, and moreover synthesis processing can be performed such that the acoustic image position moves so that the acoustic image radially approaches or recedes from the position of the listener, or moves in rotation in the clockwise or counterclockwise direction, or in the left or right direction.

Further, in acoustic image localization processing based on the head acoustic transfer function from the virtual sound source position and speakers to both the listener's ears of reproduction acoustic signals, the modification processing described above by the acoustic image localization processing means of the acoustic image localization processing device of this invention performs processing of the above transfer function of the former, so that there is the advantage that the listener can hear reproduced sound due to a surround-sound reproduced sound field, replete with a sense of presence, as if reproduced by the virtual speakers of numerous channels, with the localization position of the reproduced acoustic image modified according to the image on the screen.

Further, the acoustic image localization information, modification of which is specified by the localization information modification means of the acoustic image localization processing device of this invention, is edited and recorded in association with reproduction time information for the reproduction acoustic signal, and reproduction of the reproduction acoustic signal is performed based on the recorded acoustic image localization information and reproduction time information. Hence the listener can himself create the configuration of camera angle scenes, and can view this repeatedly; at this time, there is the advantage that a sense of localization at the acoustic image localization position can be obtained from the reproduced sound also, according to the camera angle, as if the listener were in motion and facing the sound source image position appearing on the screen.

Further, the acoustic image localization processing means of the above acoustic image localization processing device of this invention modifies the acoustic image position or direction of the sound source signal provided together with the sound source signal so as to be localized in a different acoustic image position, and performs processing to modify the acoustic image localization position based on this modified acoustic image localization information. Hence there is the advantage that the listener can hear sound reproduced by speakers with the localization position of the reproduced acoustic image specified according to the image sound source position on the screen, or with the localization position of the reproduced acoustic image modified.

By means of the acoustic image localization processing method of this invention, an instruction is issued to modify the acoustic image localization information indicating the reproduced acoustic image localization position of the acoustic image, supplied according to the listening position of the listener, and processing is performed to modify the acoustic image localization position of this sound source based on the acoustic image localization information specified for modification, to obtain reproduction output. Hence reproduction sounds are reproduced with the acoustic image localization positions set appropriately according to the angle mode selected by the listener, so that there is the advantage that acoustic reproduction with a more complete sense of presence, matching the position of the reproduced sound source image, is possible.

Further, by means of the recording media of this invention, acoustic image localization information indicating the localization position of the reproduced acoustic image of a sound source with respect to the listening position of the listener is recorded in association with reproduction time information which is modified according to this acoustic image localization information. Hence when this recording media is mounted in the above acoustic image localization processing device, and when reproduction acoustic signals are provided, there is the advantage that acoustic image localization processing is performed based on the acoustic image localization information, with timing such that the reproduction time information accompanying the reproduction acoustic signal matches the reproduction time information recorded on the recording media, so that a sense of acoustic image localization differing from the default sense of acoustic image localization can be enjoyed in keeping with the reproduction acoustic signals.

BEST MODE FOR CARRYING OUT THE INVENTION

The acoustic image localization processing device of this embodiment synthesizes reproduction acoustic signals for each channel corresponding to the multi-angle function of a DVD disc, so that the listener can obtain a sense of acoustic image localization matching the angle of the reproduced screen.

Figure 1:
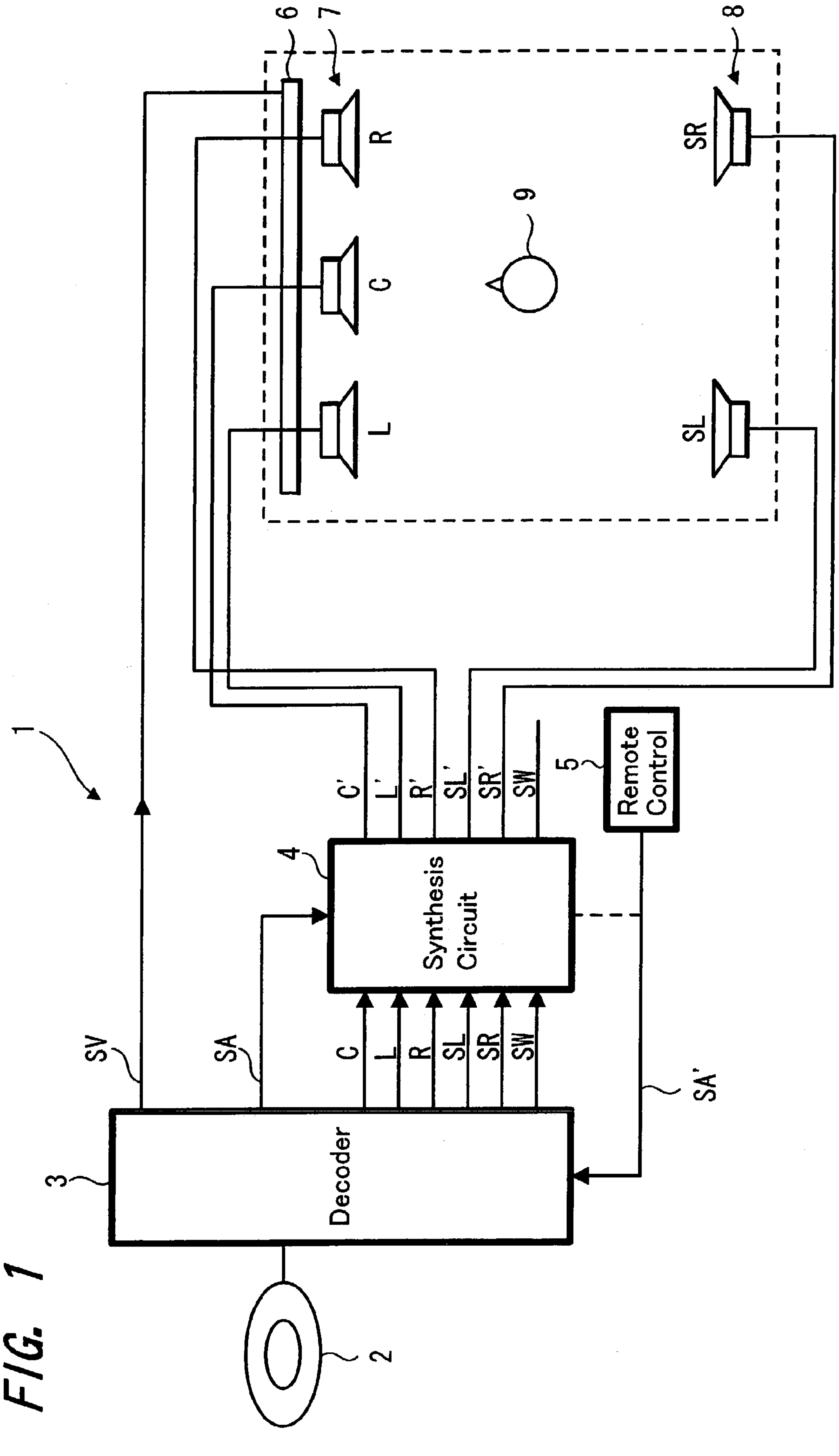
FIG. 1 is a block diagram showing the configuration of an acoustic image localization processing device applied to one embodiment.

FIG. 1 is a block diagram showing the configuration of an acoustic image localization processing device applied to this embodiment.

The acoustic image localization processing device 1 comprises a decoder 3, which decodes a reproduction signal read by an optical pickup, not shown, from a DVD disc 2, and outputs an image signal SV, angle selection signal SA, reproduction audio signals C (center), L (left), R (right), SL (rear left), SR (rear right), and SW (subwoofer) for different channels; a synthesis circuit 4 which uses the angle selection signal SA to synthesize reproduction audio signals C, L, R, SL, SR, SW for different channels, and outputs synthesized audio signals C', L', R', SL', SR', SW' for different channels; a remote control (remote commander) 5 which supplies an angle selection specification signal SA' specifying the angle selection for the decoder 3 and synthesis circuit 4; a screen 6 displaying images using image signals SV; speakers 7, 8 (the SW speaker is not shown) for the channels C, L, R, SL, SR, SW emitting reproduced sound using the synthesized audio signals C', L', R' SL', SR' SW' for each channel; and a listener 9 who views images displayed on the screen while listening to sound reproduced by the speakers 7, 8. In place of the speakers 7, 8, headphones may be used.

Here the DVD disc 2 is configured such that by means of an angle selection specification signal SA' specified by the listener 9 using the remote control 5, the angle selection is specified with respect to the angle selection signal SA which is localization information for the reproduced acoustic image, so that an arbitrary angle mode can be selected for a desired image signal SV. The above-described reproduced acoustic image localization information can also simply represent position information or direction information.

The synthesis circuit 4 has a function for supplying, to the speakers 7, 8 of the channels C, L, R, SL, SR, SW arranged to surround the listener 9, the synthesized acoustic signals C', L', R', SL', SR', SW' obtained by changing the synthesis ratio for each output channel or the channel allocation, such that the acoustic image localization position with respect to the listener 9 of the reproduced acoustic signals C, L, R, SL, SR, SW for each channel is relatively modified by the angle mode specified by angle selection through the angle selection specification signal SA'.

Ordinarily, when viewing and listening in normal mode the screen 6 or monitor is positioned in front of the listener, and the speakers 7 for the L/R/C channels are positioned on the left, right, and center in front, while speakers for the SL/SR channels are placed on the left and right behind the listener 9. The SW channel signal is a signal only for the low-tone region, and does not clearly exhibit a sense of localization; hence the speaker for the SW channel may be placed in any position within the room for viewing and listening. As the localization information for the reproduced acoustic image with respect to the listener 9, the acoustic image localization position of each virtual sound source is calculated according to the angle set, based on the relative positional relation between the listening position of the listener 9 and the speakers 7 of the L/R channels in normal mode, and signals are processed so as to localize the acoustic image in that position. These calculations may be performed by means of, for example, coordinate transformations.

It is desirable that the reproduced acoustic image localization information be represented as a direction and distance in spherical coordinates or else in orthogonal coordinates, in order to more exactly determine the acoustic image localization position; but it is difficult to exactly determine the placement positions of each of the speakers or the listening position of the listener, and so conditions may be assumed in which speakers are positioned in an average listening environment, for example, an average environment for listening in which consumer electronics are used, and these conditions may be adopted. Or, distance information may be omitted, and virtual acoustic image directions controlled using only direction information.

The operation of an acoustic image localization processing device configured in this way is explained below.

The decoder 3 decodes reproduction signals read by an optical pickup, not shown, from the DVD disc 2, and outputs the image signal SV, angle selection signal SA, and reproduction audio signals for each channel C, L, R, SL, SR, SW.

The synthesis circuit 4 uses the angle selection signal SA to synthesize the reproduction audio signals C, L, R, SL, SR, SW for each channel, and outputs synthesized audio signals C', L', R', SL', SR', SW' for each channel.

Here, the remote control (remote commander) 5 provides the decoder 3 with an angle selection specification signal SA' which specifies the angle selection, in response to the operation of the listener 9.

As a result, the angle selection specification signal SA' indicating the angle mode selected by the listener 9 is supplied to the decoder 3, and the image signal SV for the camera angle corresponding to this angle mode is output. A plurality of image signals corresponding to a plurality of camera angles (view angles) are recorded on a DVD disc supporting angle modes; one of this plurality of image signals is selected and output as the image signal SV. At the same time, the angle selection signal SA indicating the angle mode selected corresponding to the angle selection specification signal SA' is supplied to the synthesis circuit 4, and the reproduction audio signals C, L, R, SL, SR, SW for each channel supplied by the decoder 3 are subjected to modification of the synthesis ratios or channel allocation according to the reproduction acoustic image localization information with respect to the listener 9, and synthesized audio signals C', L', R', SL', SR', SW' for each channel are output.

As a result, the screen 6 displays the image of the image signal SV, and in addition the speakers 7, 8 for each of the channels C, L, R, SL, SR, SW emit reproduced sound according to the synthesized audio signals C', L', R', SL', SR', SW' for each channel, with the reproduced acoustic image localization position modified according to the image signal SV. The listener 9 can hear reproduced sound, with the reproduced acoustic image localization position modified according to the image on the screen, emitted from the speakers 7, 8.

Ordinarily, the audio signals C, L, R, SL, SR, SW for each channel are recorded on the DVD disc together with the camera angle image recorded as the default angle mode. Hence if this mode is not changed, the above-described synthesis circuit 4 outputs the input reproduction audio signals C, L, R, SL, SR, SW for each channel without performing any substantive processing, and the reproduction audio signals C, L, R, SL, SR, SW for each channel are supplied without modification to the speakers 7, 8 for the respective channels C, L, R, SL, SR, SW. On the other hand, when the listener 9 selects another angle mode, the synthesis circuit 4 synthesizes reproduction audio signals C, L, R, SL, SR, SW for each channel so as to obtain a sense of localization as if the listener 9 has moved and is facing the sound source or sound source group, with the camera capturing the image facing the sound source or sound source group.

Next, specific angle modes are explained.

Figure 5:
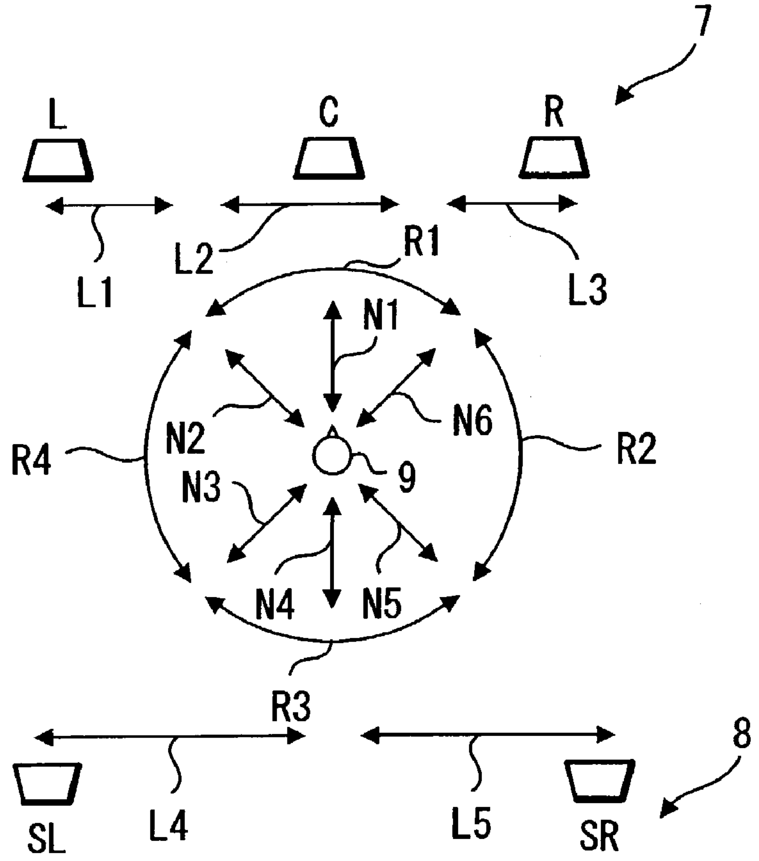
FIG. 5 is a diagram showing movement of the acoustic image position.
Figure 6:
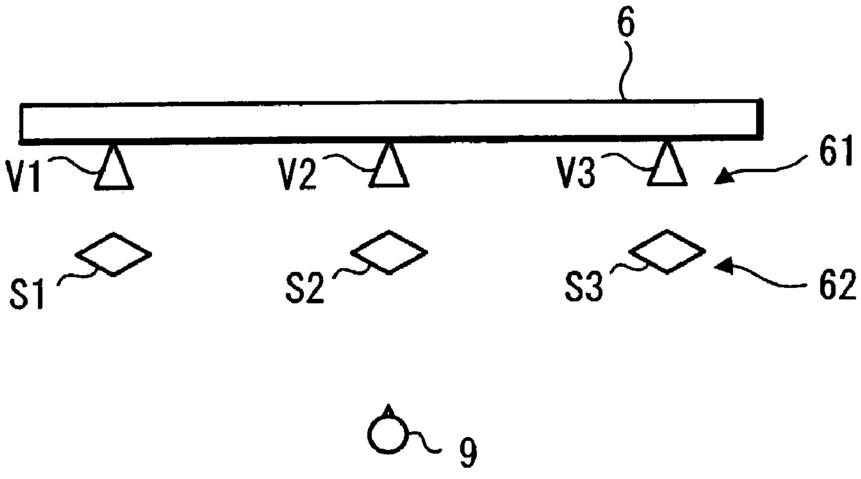
FIG. 6 is a diagram showing localization of an acoustic image with respect to the sound source.

FIG. 5 shows movement of the acoustic image position; FIG. 6 shows localization of the acoustic image with respect to the sound source.

First, the case of image and sound signals which record a live performance is taken as an example to explain an angle mode similar to an approach to the stage center displayed on the screen 6.

Here the synthesis circuit 4 causes the volume of the reproduction acoustic signal C for the channel in front-center (C) to be increased to become the synthesized acoustic signal C, and after attenuating the level of the reproduction acoustic signal C for the front-center channel (C) with an appropriate delay added, the reproduction acoustic signals (L/R) of the channels for the front left and right (L/R) are added, and the result output as the synthesized acoustic signals (L'/R'), as if moving in the forward direction from the position of the listener 9 toward the vocals and other sounds localized in the center position (C) of the speakers 7, as shown by the direction N1 moving to the front of the acoustic image position in FIG. 5, with respect to the center stage displayed on the screen 6. Also, after attenuating the levels of the acoustic signals (L/R) for channels in the front left and right (L/R), synthesized acoustic signals (SL'/SR') may be output after adding to the acoustic signals (SL/SR) of channels in the rear left and right (SL/SR). Also, the levels of the acoustic signals (SL/SR) may be attenuated.

At this time, the acoustic image localization position 62 of the sound source, for which the sound source image position 61 on the screen 6 in FIG. 6 is V2, remains at the center S2, but sound sources in sound source image positions on the left and right are changed by the synthesis circuit 4 such that acoustic image localization positions extend further in the left-right direction.

By this means, the sense of localization of the acoustic image can be modified, effectively reproducing acoustic signals such that vocals and other sounds localized in the center position (C) of the speakers 7 approach the front center from the position of the listener 9, as indicated by N1 in FIG. 5, relative to the stage center displayed on the screen 6.

Of course in this case, the synthesis circuit 4 may also perform processing to somewhat intensify the intermediate range of the reproduction acoustic signal (C') for the front center (C), so as to further enhance the sense of realism. Or, loudness correction may be performed according to the volume of the reproduction acoustic signal (C').

In the ordinary default angle mode, the reproduction acoustic signals (L/R) of channels for forward left/right (L/R) are reproduced by the L/R channel speakers, positioned, for example, at a left-right diverging angle of ±30°. In this angle mode, in order to achieve a more diverging sense of localization, the level of the reproduction acoustic signals (L/R) of the channels for the front left/right (L/R) is attenuated in reverse phase with respect to the reproduction acoustic signals (R/L) of the reversed front right and left channels (R/L), added to the original reproduction acoustic signals (L/R) and combined as the synthesized acoustic signals (L'/R').

Second, an angle mode which is a close-up of a performer at stage-left displayed on the screen 6 is explained.

For example, if a guitar player is at stage-left (on the left side of the stage as seen from the side of the audience) on the stage displayed on the screen 6, a vocalist is at center stage, and a base player is at stage-right, then the scene is photographed using the above camera angles. In this case, each of the audio signal channels is recorded on the DVD disc in the normal angle mode; hence the guitar player at stage-left is recorded in the audio signal channel (R) for the front right (R), the vocalist in the center is recorded in the audio signal channel (C) for the front center (C), and the base player at stage-right is recorded in the audio signal channel (L) for the front left (L).

When this angle mode is selected, the synthesis circuit 4 causes the volume of the reproduction audio signal (R) of the guitar player at stage-left to be somewhat increased, and this signal output to the synthesized audio signal (C') of the channel for the front center (C); causes the volume of the reproduction audio signal (C) of the center vocalist to be somewhat decreased, and this signal output to the synthesized audio signal (L') of the channel for the front left (L); and causes the volume of the reproduction audio signal (L) of the base player at stage-right to be decreased further than that of the reproduction audio signal for the center vocalist, and this signal to be output to the synthesized audio signal (L') for the front left (L). In addition, a portion of the surround channel reproduction audio signals (SL/SR) may be output to the synthesized audio signal (R') for the channel for the front right (R).

At this time, the acoustic image localization position 62 of the sound source, the sound source image position 61 of which is the right-hand V3 on the screen in FIG. 6, has its acoustic image localization position modified by the synthesis circuit 4 to become the center S2.

By this means, audio signals can be effectively reproduced with the sense of acoustic image localization changed such that performed sound localized by the performer at stage-left as displayed on the screen 6 appears to be close-up on the front right side from the position of the listener 9, as shown by N6 in FIG. 5. That is, the guitarist at stage-left is displayed at the center of the screen 6, and in addition the sound from the guitarist is reproduced with the acoustic image localized immediately in front of the listener 9.

Third, an angle mode in which the entire stage is viewed from the back of the concert hall displayed on the screen 6 is explained.

In this case, the synthesis circuit 4 outputs the reproduction acoustic signal (C) of the channel for the front center (C) without modification to the synthesized acoustic signal (C') of the channel for the front center, and after outputting the reproduction acoustic signals (L/R) for the channels for the front left and right (L/R) to the synthesized acoustic signals (L'/R') of the channels for the front left and right respectively, as well as attenuating their levels, they are also output to the synthesized acoustic signal (C') of the channel for the front center.

Further, the synthesis circuit 4 may increase somewhat the volume of the reproduction acoustic signals (SL/SR) for the surround channels and output them to the synthesized acoustic signals (SL'/SR') of the surround channels for the rear left and right, in addition to outputting a portion thereof to the synthesized acoustic signals (L'/R') of the channels for the forward left and right.

At this time, the synthesis circuit 4 causes the sound source the image position 61 of which is at V2 in the center to remain unchanged on the screen 6 in FIG. 6 at S2 in the center, but the sound sources at the sound source image positions on the left and right are changed to acoustic localization positions closer to the center.

As a result, spreading of the performers on the entire stage displayed on the screen 6 is suppressed as indicated by the movement directions L1, L3 of the acoustic images toward the center in FIG. 5 as seen from the position of the listener 9, and by this means the entire stage is viewed from the back of the concert hall as indicated by the movement directions N1, N2, N6 of acoustic images toward the rear, so that acoustic signals can be effectively reproduced with the acoustic image sense of localization modified.

Figure 2:
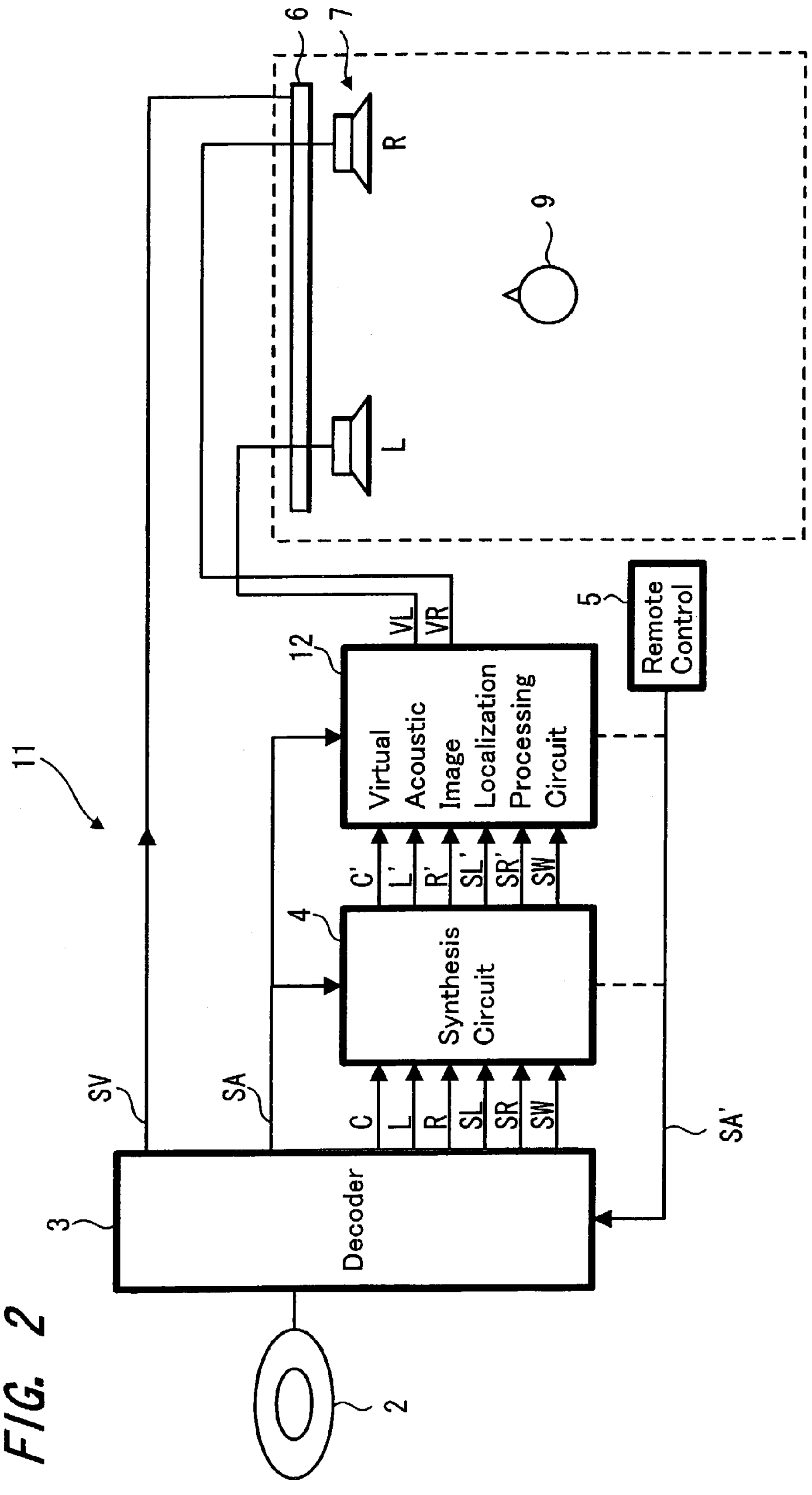
FIG. 2 is a block diagram showing the configuration of this other acoustic image localization processing device.

FIG. 2 is a block diagram showing the configuration of another acoustic image localization processing device.

Differences in the acoustic image localization processing device 11 of FIG. 2 from the acoustic image localization processing device 1 of FIG. 1 are the provision of a virtual acoustic image localization processing circuit 12 in the subsequent stage to the synthesis circuit 4, and the configuration of the speakers 7 as two channels for the front left and right, L/R. Otherwise the configuration is similar to that of FIG. 1, and so an explanation is omitted. In FIG. 2, portions corresponding to FIG. 1 are assigned the same symbols. In place of the speakers 7, headphones worn by the listener may be used for reproduction.

The operation of another acoustic image localization processing device, configured in this way, is explained below.

Reproduction signals read from the DVD disc 2 by an optical pickup, not shown, are decoded by the decoder 3, and an image signal SV, angle selection signal SA, and reproduction acoustic signals for each channel C, L, R, SL, SR, SW are output.

The synthesis circuit 4 uses the angle selection signal SA to synthesize the reproduction acoustic signals C, L, R, SL, SR, SW for each channel, and outputs synthesized acoustic signals C', L', R', SL', SR', SW' for each channel.

Further, the virtual acoustic image localization processing circuit 12 uses the angle selection signal SA, performs processing so as to reproduce a surround-sound reproduction sound field, replete with a sense of presence, such that, when reproduced by speakers positioned on the front left and right (L/R) of the listener 9, it is as if the synthesized acoustic signals C', L', R', SL', SR', SW' for each channel were reproduced in 5.1 channels by virtual speakers C, L, R, SL, SR, SW positioned to surround the listener 9.

The virtual acoustic image localization processing circuit 12 subjects each synthesized acoustic signal to acoustic image localization processing, based on the head-related transfer function (HRTF) from the acoustic image localization positions of the reproduced sound sources to both ears of the listener, and on the HRTF from the speakers 7 (L/R) to both ears of the listener. When the angle mode is changed, the relative positional relationship between the listener 9 and these acoustic image localization positions changes, and so by performing processing with the former HRTF changed, reproduced sound is obtained with the acoustic image sense of localization corresponding to the angle mode. This signal processing is, for example, performed by one set of FIR filters having an impulse response corresponding to each of the HRTFs; but by changing the coefficients of these filters, a prescribed transfer function is obtained.

As a result of operation by the listener 9, the remote control (remote commander) 5 supplies the decoder 3 with an angle selection specification signal SA' specifying the angle selection.

Based on the supplied angle selection specification signal SA', the decoder 3 outputs the image signal SV for the corresponding angle mode, and in addition supplies the corresponding angle selection signal SA to the synthesis circuit 4 and the virtual acoustic image localization processing circuit 12. The angle selection signal SA and angle selection specification signal SA' have substantially the same effect, and of course the angle selection specification signal SA' may also be supplied directly from the remote control 5 to the decoder 3, synthesis circuit 4 and virtual acoustic image localization processing circuit 12.

In this way, the angle selection specification signal SA' indicating the angle mode selected by the listener 9 is supplied to the decoder 3, and the image signal SV for the camera angle corresponding to this angle mode is output. At the same time, the angle selection signal SA is supplied to the synthesis circuit 4, and the reproduction acoustic signals C, L, R, SL, SR, SW for each channel, supplied by the decoder 3, are subjected to changes to synthesis ratios so as to obtain acoustic signals according to the reproduction acoustic image localization information with respect to the listener 9, and the synthesized acoustic signals C', L', R', SL', SR', SW' for each channel are output.

Further, the virtual acoustic image localization processing circuit 12 performs acoustic image localization processing for the synthesized acoustic signals C', L', R', SL', SR', SW' for each channel, supplied by the synthesis circuit 4, and outputs virtual acoustic signals VL, VR which reproduce a surround-sound reproduced sound field replete with a sense of presence, as if reproduced by virtual speakers with the above-described 5.1 channels.

As a result, the image of the image signal SV is displayed on the screen 6, and in addition the L, R speakers 7 for each channel emit the reproduced sound of the acoustic signals VL, VR resulting from further acoustic image localization processing of the synthesized acoustic signals C', L', R', SL', SR', SW' for each channel, the reproduction acoustic image localization position of which has been changed according to the image signal SV. The listener 9 can hear the reproduced sound of a surround-sound reproduced sound field, replete with a sense of presence as if reproduced by the above-described 5.1 channels of virtual speakers, resulting from the speakers 7 with the reproduced acoustic image localization position modified to correspond to the image on the screen 6.

In the acoustic image localization processing device 11 shown in the above FIG. 2, after changing the synthesis ratios of each reproduction acoustic signal according to the angle mode selected by the angle selection specification signal SA', only acoustic image localization processing was performed on each of the synthesized acoustic signals supplied to the acoustic image localization processing device 11; however, the present invention is not limited to this, and the synthesis processing in the synthesis circuit 4 and acoustic image localization processing in the acoustic image localization processing device 11 may also be performed simultaneously. In this case, the angle selection signal SA is supplied to the virtual acoustic image localization processing circuit 12, and the virtual acoustic image localization processing circuit 12 performs acoustic image localization processing on each reproduction acoustic signal such that a reproduction acoustic image sense of localization is obtained corresponding to the angle mode selected. That is, the localization positions of the reproduction acoustic images of each of the reproduction acoustic signals C, L, R, SL, SR, SW are determined by calculation, based on the angle selection signal SA, and acoustic image localization processing based on the HRTF from the localization positions to both ears of the listener is performed. Here, there is a block which calculates the reproduction acoustic image positions of each reproduction acoustic signal supplied from the decoder, and a block which performs acoustic image localization processing based on these determined acoustic image localization positions. HRTFs may be stored in advance in memory as data for each of prescribed angles from the forward direction of the listener, and read according to the angle determined. When realized in software through a DSP (digital signal processor) or similar, this configuration is indivisible.

Figure 3:
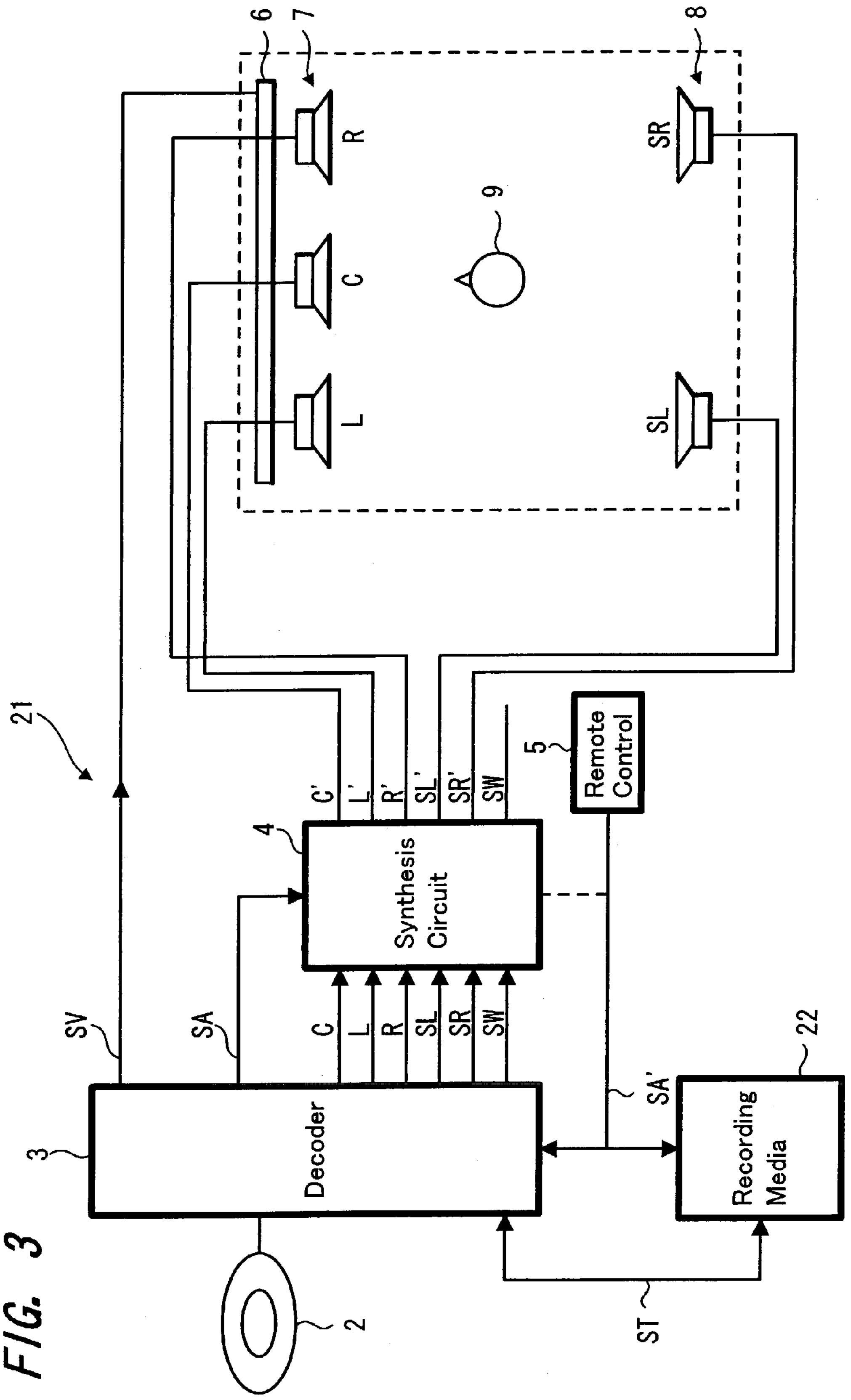
FIG. 3 is a block diagram showing the configuration of another acoustic image localization processing device.

FIG. 3 is a block diagram showing the configuration of further another acoustic image localization processing device.

The acoustic image localization processing device 21 of FIG. 3 differs from the acoustic image localization processing device 1 of FIG. 1 in the provision of recording media 22 on which are recorded the angle mode selected by the angle selection specification signal SA' and the time information (timing information) ST with an angle mode selected. Otherwise the configuration is similar to that of FIG. 1, and so an explanation is omitted. In FIG. 3, the same symbols are assigned to portions corresponding to FIG. 1.

The operation of this other acoustic image localization processing device, configured in this way, is explained below.

Reproduction signals read from the DVD disc 2 by an optical pickup, not shown, are decoded by the decoder 3, and an image signal SV, angle selection signal SA, and reproduction acoustic signals C, L, R, SL, SR, SW for each channel are output.

The synthesis circuit 4 uses the angle selection signal SA to synthesize reproduction acoustic signals C, L, R, SL, SR, SW for each channel, and outputs synthesized acoustic signals C', L', R', SL', SR', SW' for each channel.

Here the remote control (remote commander) 5 supplies an angle selection specification signal SA' specifying the angle selection, resulting from operation by the listener 9, to the decoder 3.

By this means, the angle selection specification signal SA' indicating the angle mode selected by the listener 9 is supplied to the decoder 3, and the image signal SV for the camera angle corresponding to this angle mode is output. At the same time, the angle selection signal SA is supplied to the synthesis circuit 4, and the reproduction acoustic signals C, L, R, SL, SR, SW for each channel, supplied by the decoder 3, are subjected to changes in synthesis ratio or channel allocation according to reproduction acoustic image localization information with respect to the listener 9, and the resulting synthesized acoustic signals C', L', R', SL', SR', SW' for each channel are output.

Further, the angle selection specification signal SA' is supplied to the recording media 22, and the angle mode selected by the angle selection specification signal SA', as well as the time information ST at which the angle mode was selected, are recorded. Here, the time information ST is the time code, recorded on the DVD disc 2, which is decoded by the decoder 2 and used without modification.

At this time, the synthesis circuit 4 performs acoustic image localization processing of each reproduction acoustic signal, based on acoustic image localization specification information from the listener 9, which information is relatively modified by the angle mode selected by the angle selection specification signal SA'.

By this means, the image of the image signal Sv is displayed on the screen 6, and in addition reproduced sound is emitted by the speakers 7 for channels L and R, driven by the synthesized acoustic signals C', L', R', SL', SR', SW' for each channel, the reproduction acoustic image localization positions of which are modified according to the image signal SV. The listener 9 can listen to sound reproduced by the speakers 7, 8, the reproduction acoustic image localization positions of which are modified according to the image on the screen 6.

In addition, when the listener 9 is viewing a DVD disc 2 on which is recorded, for example, a movie which supports multi-angle functions, if the listener wishes to select a different angle mode while viewing in normal angle mode, the scene transition is read out, a change is made to the angle mode selected by the angle selection specification signal SA', and when an instruction is issued to record the changed angle selection specification signal SA', the time information ST indicating the scene transition, as well as the angle mode selected by the changed angle selection specification signal SA', are recorded on the recording media 22.

When this DVD disc 2 is reproduced, the time information ST provided from the DVD disc 2 is compared with the time information ST recorded on the recording media 22; if the two coincide, the decoder 3 and synthesis circuit 4 automatically change to the angle mode selected by the corresponding angle selection specification signal SA' recorded on the recording media 22.

Of course, when the angle mode changes, synthesis ratios are changed and channel allocation of each of the reproduction acoustic signals is performed by the synthesis circuit 4 according to the camera angle, similarly to the acoustic image localization processing device 1 shown in FIG. 1, and synthesized acoustic signals are supplied to the speakers 7, 8 corresponding to each channel.

In this way, the listener 9 can himself configure camera angle scenes, and can view these repeatedly; at this time the reproduced audio is also such that a sense of localization of the acoustic image localization position 62 can be obtained, as if the listener 9 moves so as to face the sound source image position 61 displayed on the screen 6 shown in FIG. 6.

If it is possible to record any number of times on the recording media 22, then when the angle configuration is unsatisfactory, re-execution is possible. As the recording media 22, in addition to semiconductor memory, for example a VCR (videocassette recorder) tape, CD-R (Compact Disc Recordable) or other media may be used; in addition, if it is possible to record on at least a portion of the DVD disc 2 on which the images are presented, recording on the DVD disc 2 itself may be performed.

It is sufficient to be able to write to the recording media 22 a number of times equal to the number of times the angle is to be changed for the time information ST and the corresponding angle selection specification signal SA'. Hence only a small recording capacity on the recording media 22 is needed, and a portion of the memory comprised by the acoustic image localization processing device may be used.

It is desirable that a code or other character string such as title as identifies the DVD disc 2 also be recorded on the recording media 22; by this means, recording of a plurality of DVD discs on a single recording media unit is possible. Further, if codes which identify recording operations are also recorded, a plurality of angle selection patterns can be recorded for one DVD disc, so that so-called "take 1", "take 2", and similar trial-and-error and enjoyment become possible.

In the acoustic image localization processing device 21 shown in FIG. 3, synthesized acoustic signals for each channel are output to the speakers 7, 8 from the synthesis circuit 4; however, the present invention is not limited to this. As shown in FIG. 2, reproduction by fewer channel speakers than reproduction acoustic signals for each channel is also possible by adding a virtual acoustic image localization processing circuit 12.

Figure 4:
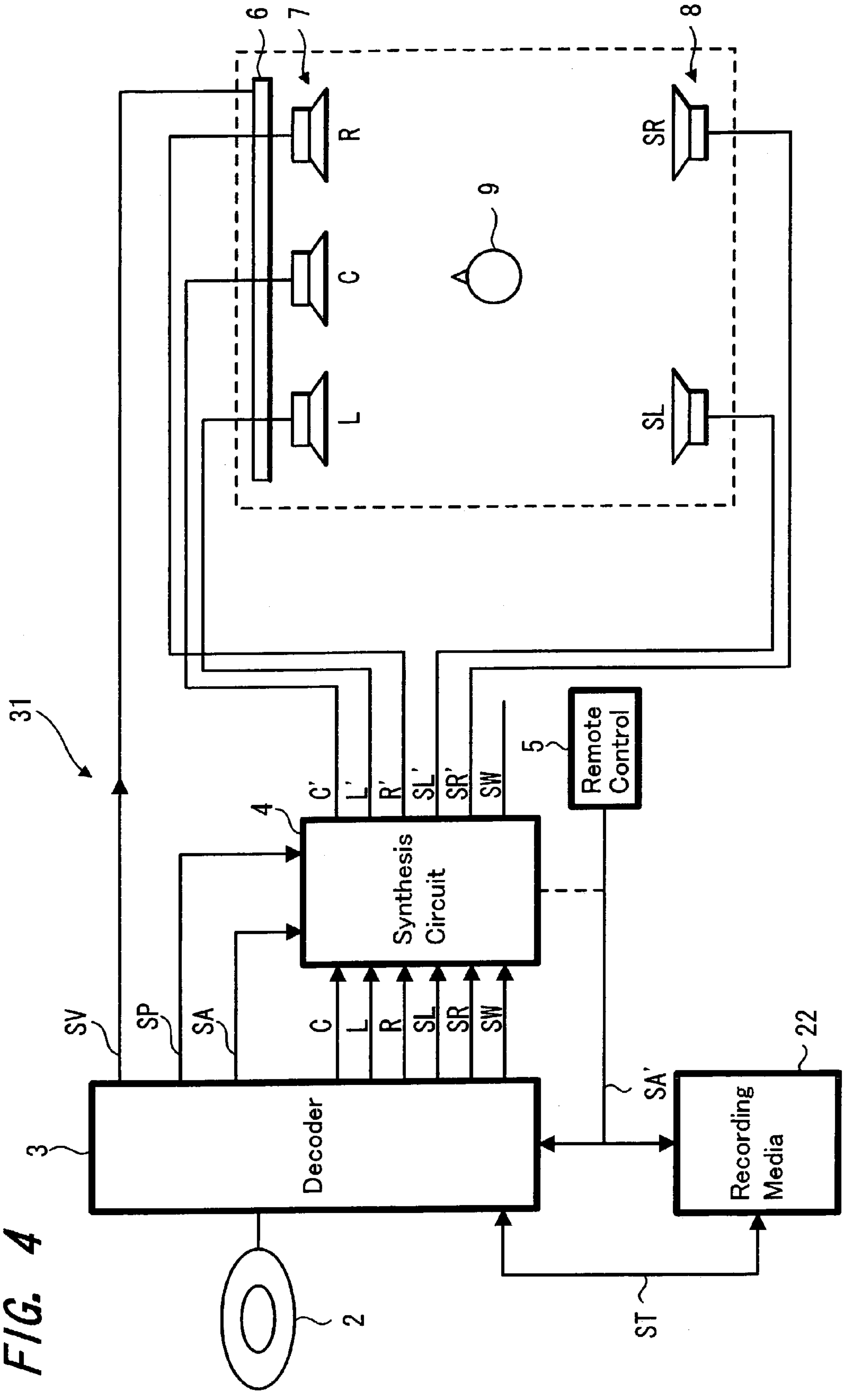
FIG. 4 is a block diagram showing the configuration of another acoustic image localization processing device.

FIG. 4 is a block diagram showing the configuration of yet further another acoustic image localization processing device.

The acoustic image localization processing device 31 of FIG. 4 differs from the acoustic image localization processing device of FIG. 1 in that sound source position information is provided by the DVD disc 2, and recording media 22 is provided on which is recorded an angle mode selected by the angle selection specification signal SA' shown in FIG. 3, and time information ST for which the angle mode is selected. Otherwise the configuration is similar to that of FIG. 1, and so an explanation is omitted. In FIG. 4, portions corresponding to those in FIG. 1 or FIG. 3 are assigned the same symbols.

The operation of an acoustic image localization processing device configured in this way is explained below.

Reproduction signals read from the DVD disc 2 by an optical pickup, not shown, are decoded by a decoder 3, and image signals SV, sound source position information SP, angle selection signals SA, and reproduction acoustic signals for each channel C, L, R, SL, SR, SW are output.

The synthesis circuit 4 uses the sound source position information SP and angle selection signals SA to synthesize the reproduction acoustic signals for each channel C, L, R, SL, SR, SW, and outputs synthesized acoustic signals C', L', R', SL', SR', SW' for each channel.

Here each sound source recorded on the DVD disc 2 has sound source position information SP, and sound source position information SP is acquired by the decoder 3 for the reproduction acoustic signals C, L, R, SL, SR, SW for each channel. Sound source position information SP may also be provided only for the principal sound source among all the sound sources. For example, the speaker which reproduces the reproduction acoustic signal SW may be placed anywhere in the room, and so position information for this signal may be omitted. When the sounds reproduced by the signals SL, SR are surround-sound sounds, it is implicitly understood that they are positioned diagonally behind the listener, and so in this case the sound source position information can be omitted. In other words, default position information may be employed for the sound sources of channels for which sound source position information is omitted. Also, sound source position information SP may include relative coordinate values for the sound source localization position 62 from a reference position, such as the sound source image position 61 on the screen 6 shown in FIG. 6, as well as acoustic image position movement information, shown in FIG. 5.

In this case, according to the sound source position information SP provided for each sound source, acoustic image localization positions are modified such that the acoustic image localization positions 62 come to be on the left S1, at the center S2 and on the right S3 as opposed to the sound source image positions 61 on the screen 6 in FIG. 6, being on the left V1, at the center V2 and on the right V3, as seen from the position of the listener 9. In addition, acoustic image positions are moved to approach or recede from the position of the listener 9 in radial directions N1 to N6, to move in rotation clockwise or counterclockwise R1 to R4, and to move in right-left directions L1 to L5, as in FIG. 5.

The remote control (remote commander) 5 supplies the decoder 3 with an angle selection specification signal SA'specifying the angle selection, as a result of operation by the listener 9.

By this means, an angle selection specification signal SA' indicating the angle mode selected by the listener 9 is supplied to the decoder 3, and image signals SV at the camera angle corresponding to this angle mode are output. At the same time, the sound source position information SP and angle selection signal SA are supplied to the synthesis circuit 4, the synthesis ratios of reproduction acoustic signals C, L, R, SL, SR, SW for each channel, supplied by the decoder 3, are modified according to the reproduction acoustic image localization information with respect to the listener 9, and synthesized acoustic signals for each channel C', L', R', SL', SR', SW' are output.

As a result, the synthesis circuit 4 calculates relative positions, as seen by the listener 9, of each sound source, based on the sound source position information 9 corresponding to each reproduction acoustic signal and the angle selection specification signal SA' indicating the angle mode selected by the listener 9, and outputs synthesized acoustic signals to each of the speakers 7, 8 so as to reproduce acoustic signals corresponding to the relative positions. The listener 9 can hear sound reproduced by the speakers 7, 8, with the reproduced acoustic image localization positions specified corresponding to the positions of sound source images on the screen 6, or with reproduction acoustic image localization positions modified.

Similarly to the above-described FIG. 3, the angle selection specification signal SA' is supplied to the recording media 22, and the angle mode selected by the angle selection specification signal SA' as well as time information (timing information) ST for the selected angle mode are recorded. Here the time information ST is read and used without modification when the decoder 2 decodes the time code recorded on the DVD disc 2.

Here, the synthesis circuit 4 performs acoustic image localization processing of each acoustic signal, based on the angle mode selected by the angle selection specification signal SA' and acoustic image localization specification information from the listener 9, modified by the sound source position information SP.

As a result, the images of image signals SV are displayed on the screen 6, and in addition the speakers 7, 8 for each of the channels C, L, R, SL, SR, SW emit reproduced sound based on the synthesized acoustic signals C', L', R', SL', SR', SW' for each channel, the reproduced acoustic image localization positions of which are modified according to the image signals SV. The listener 9 can hear sound reproduced by the speakers 7, 8, with the reproduced acoustic image localization positions modified according to the image on the screen 6.

If, in addition, the listener is viewing a DVD disc 2 on which is recorded, for example, a movie which supports a multi-angle function, and if the listener wishes to select another angle mode at a given scene while viewing the movie in the normal angle mode, the scene transition is read, the angle mode selected by the angle selection specification signal SA' is changed, and an instruction is issued to record the changed angle selection specification signal SA'; the time information ST indicating the scene transition, as well as the angle mode selected by the changed angle selection specification signal SA', are then recorded on the recording media 22.

During reproduction of the DVD disc 2, the time information ST provided from the DVD disc 2 is compared with the time information ST recorded on the recording media 22; if the two coincide, the decoder 3 and synthesis circuit 4 are automatically changed based on the angle mode selected by the corresponding angle selection specification signal SA' recorded on the recording media 22, and on the sound source position information SP provided from the DVD disc 2.

Of course, if the angle mode is changed, the synthesis circuit 4 changes synthesis ratios and performs channel allocations for each acoustic signal based on the camera angle, similarly to the acoustic image localization processing device 1 shown in FIG. 1, and provides reproduction acoustic signals to the speakers 7, 8 corresponding to each channel.

In this way, the listener 9 can himself configure camera angle scenes, and can repeat this process to enjoy the content; a sense of localization of the acoustic image localization position 62 is obtained as if the listener 9 moves to face the sound source image position 61 displayed on the screen 6 shown in FIG. 6, in response to the camera angle.

If it is possible to record any number of times on the recording media 22, then when the angle configuration is unsatisfactory, re-execution is possible. As the recording media 22, in addition to semiconductor memory, for example a VCR (videocassette recorder) tape, CD-R or other media may be used; in addition, if it is possible to record on at least a portion of the DVD disc 2 on which the images are presented, recording on the DVD disc 2 itself may be performed.

Similarly to the recording media 22 in the acoustic image localization processing device shown in FIG. 3, the amount of information for recording is small, so that a portion of the memory comprised by the acoustic image localization processing device may be used. Also, as in the previous example, a disc ID code and recording operation ID code may be recorded on the recording media 22.

In the acoustic image localization processing device 31 shown in FIG. 4, reproduction acoustic signals for each channel are output to the speakers 7, 8 by the synthesis circuit 4; however, the present invention is not limited to this, and a virtual acoustic image localization processing circuit 12 may be added, as shown in FIG. 2, to perform reproduction using speakers for a number of channels smaller than the number of reproduction acoustic signals.

In the acoustic image localization processing devices shown in FIGS. 1 through 4 of the embodiments mentioned above, examples were shown in which the angle selection specification signal SA', which indicates the angle mode selected by the listener 9, is provided to the synthesis circuit 4 or virtual acoustic image localization processing circuit 12 via the decoder 3; but the present invention is not limited to this, and the signal may be directly provided to the synthesis circuit 4 or the virtual acoustic image localization processing circuit 12. For example, if a decoder 3 is incorporated in a separate DVD player or AV receiver, the acoustic image localization processing device of this embodiment may supply the angle selection specification signal SA' selected by operation by the listener 9 to the synthesis circuit 4 or virtual acoustic image localization processing circuit 12. In this case also, this angle selection specification signal SA' is supplied to the decoder 3 incorporated in the DVD player or AV receiver in order to select the image signals corresponding to the selected angle mode. In either case, it is sufficient that the angle selection specification signal SA' be provided to means for generating image signals SV and reproduction acoustic signals corresponding to the changed angle mode selected by the listener 9.

In addition, examples were described in which the angle selection specification signal SA' is supplied from the remote control 5; but the present invention is not limited to this, and of course the signal may also be generated and supplied by operation keys comprised by the acoustic image localization processing device, or by other input means.

Below, another application example is explained.

As recording media providing sound sources having position information, MIDI (Musical Instrument Digital Interface) sound sources providing music data, video games, and other sound sources exist, to which application of this invention is also possible, in addition to the above-described DVD video discs.

In a MIDI sound source, among the control change information, the expansion code control number #10, which determines pan, specifies the localization of the acoustic image for stereo output. When this control number #10 is 0, [the position] is left; 64 is center; and 127 is right, so that the acoustic image localization can be freely specified over the range from left to right. That is, music data is supplied accompanying this information, and by changing this value, the sound source localization position can be modified.

On applying this embodiment, when MIDI data is reproduced, the above-described synthesis circuit 4 changes this value according to the listener's preference and the listing position of the listener. Synthesis processing is performed so that the sound source sound is reproduced from the modified sound source localization position.

Of course, the modification information may be recorded on recording media, as in the above-described embodiments, and may be again loaded upon the next reproduction.

Also, recording media on which is recorded this modification information may be distributed separately from the recording media with the MIDI sound sources.

Ordinary MIDI sound sources are reproduced by speakers positioned on the front-left and front-right of the listener 9; but by means of the above-described synthesis circuit 4, this information may be expanded by expansion codes, and subjected to synthesis processing such that the acoustic image can be localized over a range of 360° around the listener.

In this case, for example, an angle selection specification signal SA' indicating an angle mode selected by the listener 9 may be used by the above-described synthesis circuit 4 to redefine the values of control #10, with 64 becoming the center C channel, 48 the L channel, 76 the R channel, 21 the rear-left SL channel, and 107 the rear-right SR channel. Or, a configuration may be adopted in which a system controller, comprising the above-described synthesis circuit 4, a virtual acoustic image localization processing circuit 12, or a microcomputer, not shown, performs conversion using a table which converts the values of this control #10, which is position information into each of the channels of corresponding sound source localization positions.

In the case of a video game, the reproduction signal includes information indicating the sound source image position 61, shown in the above FIG. 6, for a character appearing in a scene, and information indicating the acoustic image localization position 62. This position information is changed according to instructions issued by the player using a game controller or other pointing devices so as to change the position of a principal character. Based on this modified position information and on the angle selection specification signal SA' indicating the selected angle mode, the acoustic image localization position for the character is determined; and sound indicated by the acoustic image localization position 62 is reproduced, by the above-described synthesis circuit 4 and virtual acoustic image localization processing circuit 12, at the localization position 61 indicated by an appropriate sound source image position 61 according to the position and motion of the character on the screen 6. In addition to the above-described video game equipment, this embodiment can of course also be applied to game software operated interactively over the Internet. Also, this processing can be described in a program for distribution as game software.

In addition, this embodiment can also be applied to a teleconferencing system. In particular, in a teleconferencing system with multiple points indicating bidirectional conferencing between numerous locations, when the face of another speaker is displayed in an arbitrary sound source image position 61 on the screen shown in FIG. 6, the above-described synthesis circuit uses the angle selection specification signal SA' indicating the angle mode selected by the speaker to add modification information, and by enabling localization of acoustic images in FIG. 6 for each of the speakers in positions corresponding to the sound source image positions 61 of their respective faces, participants can focus on the conference without feeling a sense of strangeness.

By means of the acoustic image localization processing device of the above-described embodiments, each acoustic image localization position is set appropriately and sound is reproduced according to the angle mode (view mode) selected by the listener, so that sound reproduction can be made more suitable to the reproduced sound source image position, for a heightened sense of presence. Also, reproduction mainly of a performer or other sound source which the listener wishes to view is possible, so that the range of application can be broadened.

In addition, acoustic image localization processing is performed according to new sound source position information for each sound source which has been reset; consequently each sound source can be localized in an intended acoustic image localization position, so that greater affinity with reproduced images can be achieved.

Also, modified angle modes and time information for the modification can be recorded on recording media in association with time information for reproduced images, so that reproduction signals can be reproduced based on modified information during the next reproduction session, and as a result a reproduction pattern suited to the listener's own tastes can be created. Of course such a pattern can be recreated any number of times; and if the recording media is removable, a plurality of reproduction patterns can be created.

In the case of recording media serving as a source of sound sources from which sound source position information can be acquired, by reconfiguring localization information for each sound source in a desired angle mode, including sound source position information, sound reproduction which is optimally suited to reproduced images is possible.

The present invention is not limited to the above-described application examples, but can be applied to other electronic equipment enabling modification of the position information of reproduced sound.

INDUSTRIAL APPLICABILITY

The present invention can be applied to acoustic image localization processing devices which are able to synthesize reproduction acoustic signals for each channel in supporting multi-angle functions of DVD discs, enabling the listener to obtain a sense of acoustic image localization suited to the angle of reproduced images.

DESCRIPTION OF REFERENCE NUMERALS

1, 11, 21, 31 ACOUSTIC IMAGE LOCALIZATION PROCESSING DEVICE

2 DVD DISC

3 DECODER

4 SYNTHESIS CIRCUIT

5 REMOTE CONTROL

6 SCREEN

7, 8 SPEAKER

9 LISTENER

12 VIRTUAL ACOUSTIC IMAGE LOCALIZATION PROCESSING CIRCUIT

22 RECORDING MEDIA

SV IMAGE SIGNAL

SA ANGLE SELECTION SIGNAL

SA' ANGLE SELECTION SPECIFICATION SIGNAL

ST TIME INFORMATION

SP SOUND SOURCE POSITION INFORMATION

N1 TO N6 DIRECTION OF MOTION OF ACOUSTIC IMAGE POSITION, APPROACHING OR RECEDING RADIALLY

R1 TO R4 DIRECTION OF MOTION OF ACOUSTIC IMAGE POSITION, ROTATING CLOCKWISE OR COUNTERCLOCKWISE

L1 TO L5 DIRECTION OF MOTION OF ACOUSTIC IMAGE, IN LEFT-RIGHT DIRECTION

61 SOUND SOURCE IMAGE POSITION

V1 LEFT SOUND SOURCE IMAGE POSITION

V2 CENTER SOUND SOURCE IMAGE POSITION

V3 RIGHT SOUND SOURCE IMAGE POSITION

62 ACOUSTIC IMAGE LOCALIZATION POSITION

S1 LEFT ACOUSTIC IMAGE LOCALIZATION POSITION

S2 CENTER ACOUSTIC IMAGE LOCALIZATION POSITION

S3 RIGHT ACOUSTIC IMAGE LOCALIZATION POSITION

The invention claimed is:

1. An acoustic image localization processing device for synthesizing acoustic signals to match an image signal reproduced from a video disc using an angle mode selected by a viewer, comprising:

a decoder for decoding a reproduction signal reproduced from said video disc in accordance with the selected angle mode and for outputting an angle selection signal corresponding to the selected angle mode; said reproduction signal including the image signal corresponding to the angle mode, an audio signal having a plurality of channels, and a sound source signal indicating a position of at least one sound source within the audio signal; and modification means for modifying said audio signal using the angle selection signal to correspond to the selected angle mode, thereby matching the image signal corresponding to the selected angle mode; the modification means including:

localization information modification means for applying modifications to acoustic image localization information indicating one of a predetermined reproduction acoustic image localization position and a direction with respect to the sound source signal and for providing new acoustic image information; and acoustic image localization processing means for performing processing to modify one of the reproduction acoustic image localization position and the direction, based on the acoustic image localization information provided by said localization information modification means with respect to said sound source signal.

2. The acoustic image localization processing device according to claim 1, wherein said localization information modification means modifies one of the reproduction acoustic image localization position and the direction of said sound source viewed by the viewer, by modifying an angle at which the viewer faces the sound source localized in one of said reproduction acoustic image localization position and the direction, determined in advance.

3. The acoustic image localization processing device according to claim 1, wherein said acoustic image localization processing means comprises a synthesis circuit that modifies one of synthesis ratios and channel allocations of said sound source signals for output to at least two channels.

4. The acoustic image localization processing device according to claim 1, wherein said acoustic image localization processing means performs acoustic image localization processing based on a head-related transfer function from the reproduction acoustic image localization position of said sound source, provided by said localization information modification means, to both ears of the viewer.

5. The acoustic image localization processing device according to claim 1, wherein said acoustic image localization processing means comprises:

synthesis means for modifying one of synthesis ratios and channel allocations of said sound source signals for output to at least two channels, and signal processing means for performing acoustic image localization processing based on the head-related transfer function from a reproduction acoustic image localization position, determined by said synthesis means, to both ears of the viewer.

6. The acoustic image localization processing device according to claim 1, further comprising recording means, wherein:

acoustic image localization information modified by said localization information modification means and reproduction time information for which the acoustic image localization information is modified are recorded in association by said recording means; and said sound source signal processing and reproduction are performed based on said acoustic image localization information and said reproduction time information recorded by said recording means.

7. The acoustic image localization processing device according to claim 6, wherein, together with said acoustic image localization information and said reproduction time information, information to identify a recording operation is recorded by said recording means.

8. An acoustic image localization processing device for synthesizing acoustic signals to match an image signal reproduced from a video disc using an angle mode selected by a viewer, comprising:

a decoder for decoding a reproduction signal reproduced from said video disc in accordance with the selected angle mode and for outputting an angle selection signal corresponding to the selected angle mode; said reproduction signal including the image signal corresponding to the angle mode, an audio signal having a plurality of channels, and a sound source signal indicating a position of at least one sound source within the audio signal; and modification means for modifying said audio signal using the angle selection signal to correspond to the selected angle mode, thereby matching the image signal corresponding to the selected angle mode; the modification means including:

localization information modification means for modifying one of acoustic image localization information supplied accompanying the sound source signal to indicate a reproduction acoustic image localization position and a direction of the sound source signal to thereby provide modified acoustic image localization information; and, acoustic image localization processing means for performing processing to modify one of reproduction acoustic image localization position and the direction, based on acoustic image localization information provided by said localization information modification means for said sound source signal.

9. The acoustic image localization processing device according to claim 8, wherein said localization information modification means modifies one of reproduction acoustic image localization position and the direction of said sound source as seen by the viewer, by modifying one of an angle at which the viewer faces the sound source localized at said reproduction acoustic image localization position and the direction, determined in advance.

10. The acoustic image localization processing device according to claim 8, wherein said acoustic image localization processing means comprises a synthesis circuit for modifying one of synthesis ratios and channel allocations of said sound source signals for output to at least two channels.

11. The acoustic image localization processing device according to claim 8, wherein said acoustic image localization processing means performs acoustic image localization processing based on the head-related transfer function from a reproduction acoustic image localization position of said sound source, provided by said localization information modification means, to both ears of the viewer.

12. The acoustic image localization processing device according to claim 8, wherein said acoustic image localization processing means comprises:

synthesis means for modifying one of synthesis ratios and channel allocations of said sound source signals for output to at least two channels; and, signal processing means for performing acoustic image localization processing based on the head-related transfer function from a reproduction acoustic image localization position newly determined by said synthesis means, to both ears of the viewer.

13. The acoustic image localization processing device according to claim 8, further comprising recording means, wherein acoustic image localization information modified by said localization information modification means, and reproduction time information for which the acoustic image localization information is modified, are recorded in association by said recording means; and, processing and reproduction of said sound source signals are performed based on said acoustic image localization information and said reproduction time information, recorded by said recording means.

14. The acoustic image localization processing device according to claim 13, wherein said recording means records information to identify a recording operation, together with said acoustic image localization information and said reproduction time information.

15. An acoustic image localization processing method of synthesizing acoustic signals to match an image signal reproduced from a video disc using an angle mode selected by a viewer, comprising the steps of:

decoding a reproduction signal reproduced from said video disc in accordance with the selected angle mode and generating an angle selection signal corresponding to the selected angle mode; said reproduction signal including the image signal corresponding to the angle mode, an audio signal having a plurality of channels, and a sound source signal indicating a position of at least one sound source within the audio signal; and modifying said audio signal using the angle selection signal to correspond to the selected angle mode, thereby matching the image signal corresponding to the selected angle mode; the modification step including:

modifying acoustic image localization information indicating one of a reproduction acoustic image localization position and a direction, determined in advance, for the sound source signal to thereby provide modified acoustic image localization information; and applying processing to said sound source signal to modify one of the reproduction acoustic image localization position and the direction based on said provided acoustic image localization information.

16. The acoustic image localization processing method according to claim 15, wherein the step of modifying the acoustic image localization information includes modifying the angle at which the viewer faces the sound source localized in one of said reproduction acoustic image localization position and direction to thereby modify one of the reproduction acoustic image localization position and the direction of said sound source as seen by the viewer.

17. An acoustic image localization processing method of synthesizing acoustic signals to match an image signal reproduced from a video disc using an angle mode selected by a viewer, comprising the steps of:

decoding a reproduction signal reproduced from said video disc in accordance with the selected angle mode and generating an angle selection signal corresponding to the selected angle mode; said reproduction signal including the image signal corresponding to the angle mode, an audio signal having a plurality of channels, and a sound source signal indicating a position of at least one sound source within the audio signal; and modifying said audio signal using the angle selection signal to correspond to the selected angle mode, thereby matching the image signal corresponding to the selected angle mode; the modification step including:

modifying acoustic image localization information supplied accompanying sound source signals that indicates one of a reproduction acoustic image localization position and a direction for the sound source signal to thereby provide modified acoustic image localization information; and, applying processing to said sound source signal to modify one of the reproduction acoustic image localization position and to a direction based on said modified acoustic image localization information.

18. The acoustic image localization processing method according to claim 17, wherein the step of modifying the acoustic image localization information is to modify the angle at which the viewer faces the sound source localized in one of said reproduction acoustic image localization position and the direction to thereby modify one of the reproduction acoustic image localization position and the direction of said sound source as seen by the viewer.

* * * * *